United States Patent [19]

Stelck

[11] 4,363,613
[45] Dec. 14, 1982

[54] APPARATUS FOR FORMING PROTUBERANCES ON A LINE

[76] Inventor: Larry W. Stelck, 116 Easy Street Ct., Edmond, Okla. 73034

[21] Appl. No.: 223,732

[22] Filed: Jan. 9, 1981

[51] Int. Cl.³ .................. B29D 31/00; B29C 25/00
[52] U.S. Cl. ............................ 425/237; 425/384; 425/392; 264/284
[58] Field of Search .............. 425/237, 384, 392; 264/284

[56] References Cited

U.S. PATENT DOCUMENTS 3,121,913  2/1964  Hagmann ............... 425/237 X
3,825,393  7/1974  Bittner ...................... 425/392

Primary Examiner—Thomas P. Pavelko
Attorney, Agent, or Firm—E. Harrison Gilbert, III

[57] ABSTRACT

Two roller elements are spatially related so that grooves therein are aligned to define an opening between the roller elements. The grooves have pluralities of cavities formed therein into which material from a line is squeezed as the line is passed through the opening so that protuberances are formed on the line. A heating element is provided to soften the line prior to having the protuberances formed, and a cooling chamber is provided to cool the line after the protuberances have been formed.

14 Claims, 5 Drawing Figures

U.S. Patent  Dec. 14, 1982  4,363,613
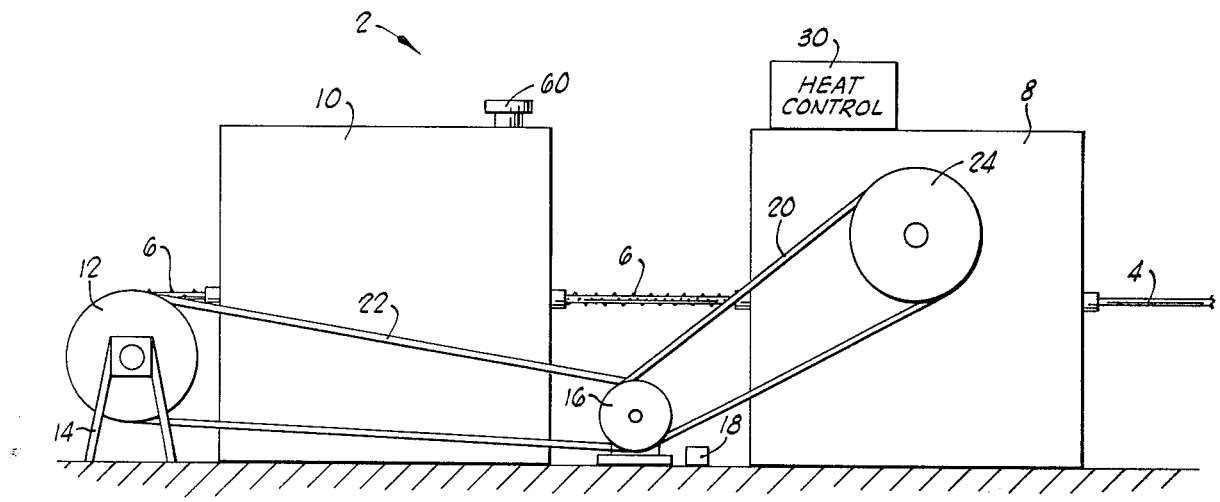
FIG. 1
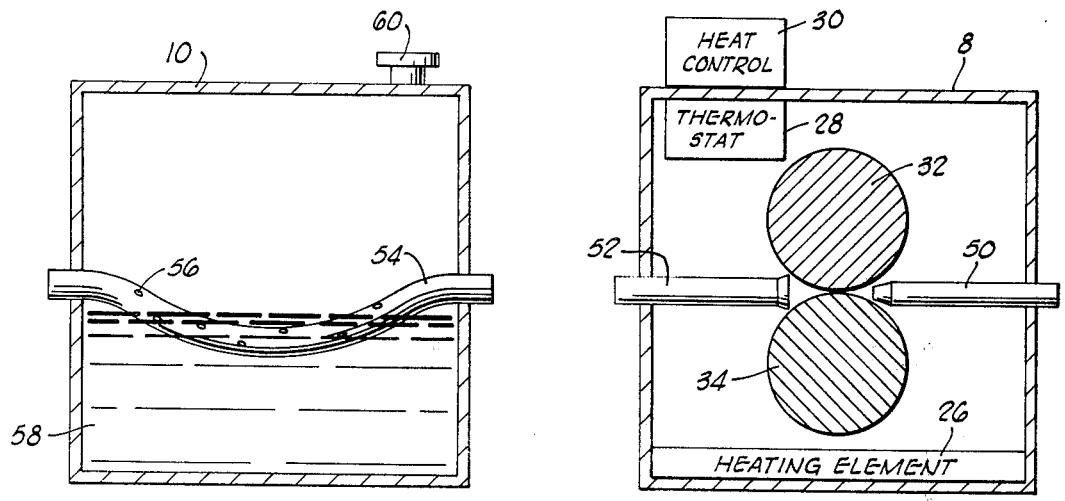
FIG. 2  FIG. 3
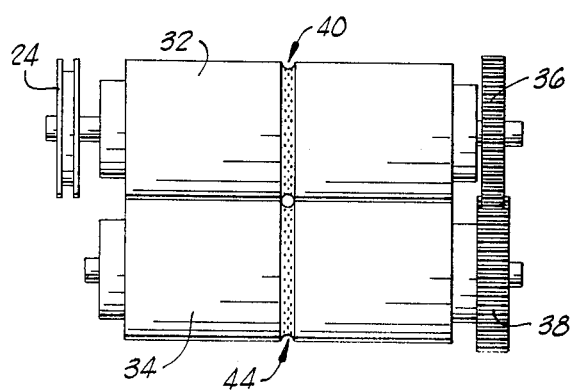 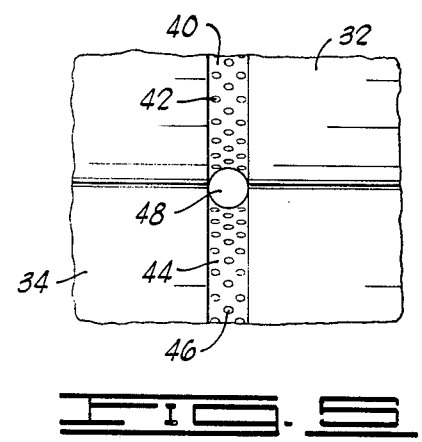
FIG. 4  FIG. 5

APPARATUS FOR FORMING PROTUBERANCES ON A LINE

BACKGROUND OF THE INVENTION

This invention relates to apparatus for forming protuberances on a line and more particularly, but not by way of limitation, to apparatus for manufacturing string of the type disclosed in my co-pending U.S. patent application Ser. No. 214,188 filed Dec. 8, 1980.

Heretofore, substantially smooth-surfaced materials have been used for stringing tennis rackets and the like. With such smooth-surfaced materials, engagement of a ball or other object by the racket is generally by means of the angular relationship between the racket and the ball and by means of friction between the surface of the string and the surface of the ball. Such smooth-surfaced line provides little mechanical engagement, other than the frictional engagement, with the ball for assisting in spinning the ball when the string engages the ball.

However, because it is at times advantageous to impart various types of spin to a tennis ball or the like during the playing of a game, for example, there is a need for a suitable string which provides or increases the mechanical connection between the ball and the line comprising the network of the racket so that improved spin can be imparted to the ball. Because there is the need for such a string, there is the additional need for an apparatus for manufacturing such a string.

SUMMARY OF THE INVENTION

The present invention fulfills the need for such an apparatus by providing a novel and improved apparatus for forming protuberances on a line. Broadly, the apparatus includes heating means for heating the line, squeezing means for compressing portions of the heated line so that other portions of the line are forced outward of the compressed portions to form protuberances with respect thereto, cooling means for cooling the squeezed line, and moving means for moving the line with respect to said heating means, said squeezing means and said cooling means.

It is a general object of the present invention to provide a novel and improved apparatus for forming protuberances on a line. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is an elevational schematic illustration of a preferred embodiment of the present invention.

FIG. 2 is a partial sectional elevational view of one portion of the apparatus shown in FIG. 1.

FIG. 3 is a partial sectional view of another portion of the apparatus shown in FIG. 1.

FIG. 4 is a front elevational view of two roller means of the present invention.

FIG. 5 is an enlarged view of a portion of the roller means shown in FIG. 4.

DETAILED DESCRIPTION OF THE PREFERRED EMBODIMENT OF THE INVENTION

With reference now to the drawings a preferred embodiment of the present invention will be described. The apparatus constructed in accordance with the present invention is generally referred to in FIG. 1 by the reference numeral 2. The apparatus 2 operates to take a line 4 and form a plurality of protuberances 6 thereon. To have the protuberances 6 properly formed thereon, the line 4 passes through a first housing 8 and a second housing 10 having certain elements of the present invention located therein. Upon exiting the second housing 10, the line 4 having the protuberances 6 properly formed thereon is wound, in the preferred embodiment, on a spool 12 mounted on a suitable brace or stand 14.

The line 4 is so moved through the housings 8 and 10 and onto the spool 12 by means of a suitable moving means which will be more fully described hereinbelow, but which FIG. 1 shows includes a motor 16 having a suitable motor speed control apparatus 18 associated therewith for selectably varying the speed of the motor 16 and consequently the speed of operation of the apparatus 2. Extending from the motor 16 are suitable rotary movement coupling means 20 and 22, such as drive belts, for transferring the rotary movement of the motor 16 to a pulley 24 associated with subsequently described elements contained in the first housing 8 and to a suitable pulley associated with the spool 12.

The elements of the present invention associated with the first housing 8 are schematically illustrated in FIG. 3. These elements include heating means for heating the line 4 and squeezing means for compressing portions of the heated line 4 so that other portions of the line 4 are forced outward of the compressed portions to form protuberances with respect to the compressed portions. To properly direct the line 4 on its passage through the housing 8, the first housing 8 of the present invention also includes suitable guide means disposed therein.

FIG. 3 shows that the heating means includes a heating element 26, a heat detecting element such as a thermostat 28, and heat control means 30 for properly operating the heating element 26 and the thermostat 28 to achieve a selectable temperature within the interior of the first housing 8. The heating element 26, the thermostat 28, and the heat control means 30 are of any appropriate type as known in the art to achieve the requisite temperatures for softening the line 4 so that it can be squeezed in accordance with the present invention as subsequently described. For example, if the line 4 is a monofilament line of a suitable material, the heating means should be able to heat the interior of the housing 8 to a temperature within the range of approximately 400° F. to approximately 600° F. It is desirable to control the temperature over a range of temperatures because the optimum temperature at which the line 4 is to be heated varies proportionately with the speed at which the squeezing means rotates. In other words, the faster the speed is, the hotter the temperature should be.

It is to be noted that the present invention can operate either by heating the contents of the first housing 8, such as the squeezing means and the line 4 passing therethrough, or by directly heating the line 4 prior to its entry into the first housing 8. Other suitable heating means can also be used.

The squeezing means includes a first roller means 32 and a second roller means 34 which are more particularly shown in FIG. 4. The first and second roller means 32 and 34 are specifically shown to be cylindrical members. The first roller means 32 has the pulley 24 fixedly secured to one end thereof so that the rotational movement transmitted by the coupling means 20 to the pulley 24 rotates the first roller means 32. Connected to the opposite end of the roller means 32 is a first gear means 36 which meshes with a second gear means 38 connected to a corresponding end of the second roller means 34 to transmit rotational movement thereto. In the preferred embodiment the gear means 36 and 38 are properly sized and rotationally associated with respect to each other to cause the first and second roller means 32 and 34 to synchronously rotate in appropriate directions (i.e., one rotates clockwise and the other rotates counterclockwise). The roller means 32 and 34 also include appropriate sleeves extending therefrom for being journaled in a suitable support means, such as the side walls of the first housing 8. The first housing 8 preferably includes at least two walls (e.g., the top wall and one side wall) which are removable to facilitate access to the roller means mounted therein.

The first roller means 32 includes a first surface 40 defining a first groove extending perimetrically (circumferentially for the preferred embodiment) around the first roller means 32. The first surface 40 has a plurality of cavities 42 disposed therein. These elements are more clearly shown in FIG. 5. The first groove defined by the first surface 40 has a substantially semi-circular cross-sectional shape for the preferred embodiment shown in the drawings. This shape is appropriate for forming a circularly cross-sectioned line having protuberances extending therefrom. The groove defined by the surface 40 and the cavities 42 may be formed by machining the first roller means 32 which in the preferred embodiment is a cylindrical member of steel having a diameter of approximately 1.25 inch.

The second roller means 34 includes a second surface 44 defining a second groove extending perimetrically, or in the preferred embodiment, circumferentially around the second roller means 34. The second surface 44 has a plurality of cavities 46 disposed therein. The preferred embodiment of the second groove is formed similarly to the first groove and thus has a substantially semi-circular cross-sectional shape which has been appropriately machined into the second roller means 34. In the preferred embodiment the second roller means 34 is constructed of steel and has a diameter of approximately 1.25 inch.

It is to be noted that additional grooves can be disposed in the roller means 32 and 34 so that multiple lines 4 can be run simultaneously to provide several lines with protuberances thereon. In the preferred embodiment such additional grooves are placed parallel to the first and second grooves defined by the surfaces 40 and 44, respectively.

The first and second roller means 32 and 34 are retained in adjacent relation by the support means (e.g., the walls of the first housing 8) so that the first and second grooves (and any additional pairs of grooves) are substantially aligned. As shown in FIGS. 3–5 the roller means 32 and 34 are specifically maintained parallel and in tangential contact so that the aligned grooves, or in other words the aligned surfaces 40 and 44 defining the first and second grooves, define an opening therebetween. For the semi-circularly shaped grooves of the preferred embodiment, the opening has a substantially circular shape.

The diameter of the opening and thus the depths or radii of the first and second grooves are important to the present invention because they must properly relate to the predetermined diameter of the line 4 so that the line 4 can be appropriately formed with protuberances. To manufacture the specific embodiment described in my co-pending U.S. patent application Ser. No. 214,188 wherein the manufactured line is to have a diameter of approximately 0.058 inch with the protuberances approximately 0.015 inch high, the depth of each of the grooves of the apparatus 2 must be approximately 0.029 inch and the depth of each of the cavities 42 must be approximately 0.015 inch. For these dimensions the line 4 must have an outer diameter greater than 0.058 inch so that the line 4 will be squeezed as it passes through the opening 48 and portions thereof will be forced into the cavities 42 whereby protuberances are formed on the line. In other words, the opening has a diameter smaller than the predetermined diameter of the line 4 so that the line 4 is squeezed as it moves through the opening 48.

As the roller means 32 and 34 rotate, the line 4 passes through the opening 48 and has a plurality of protuberances formed thereon in an array corresponding to the predetermined array of cavities 42 disposed within the surfaces 40 and 44 of the first and second grooves. It is to be noted that the cavities 42 and 46 can be disposed on the surface in any appropriate array.

To ensure that the line 4 properly passes through the opening 48, the present invention includes the aforementioned guide means. The guide means in the preferred embodiment shown in FIG. 3 includes a first guide means 50 for directing the line 4 toward the opening 48 and a second guide means 52 for directing the line from the opening 48 and toward the second housing 10. The guide means 50 and 52 are specifically shown to include suitable conduits such as plastic or metallic tubing. The elements 50 and 52 are positioned within the housing 8 so that they extend inwardly toward the first and second grooves and the opening 48 defined therebetween. The guide means directs the line 4 through the substantially aligned first and second grooves.

The guide means forms a part of the moving means for passing the line 4 through the opening 48 so that portions of the line 4 enter the cavities 42 and 46 thereby forming protuberances on the line 4. The moving means also includes the motor 16 and associated coupling elements. Still further, the moving means includes the spool 12 which provides a collecting means for collecting the line 4 after it passes through the second housing 10.

The second housing 10 contains cooling means for cooling the squeezed line 4 after it has passed through the squeezing means contained in the first housing 8. In the preferred embodiment the cooling means includes a tubing 54 having a plurality of apertures 56 disposed therein. The tubing 54 is positioned in the second housing 10 so that at least a portion of the tubing 54 passes through a body of coolant material 58. The apertures 56 permit the coolant 58 to enter the tubing 54 and thereby physically contact the line 4 passing therethrough on its journey to the spool 12. So that additional coolant can be added, the second housing 10 has a port 60 associated therewith.

In operation, the present invention is used by selecting the line 4 to have a predetermined diameter which is greater than the predetermined diameter of the opening 48. The line 4 is heated, directly or by heating the interior of the first housing 8, and passed through the opening 48 as the drive means rotates the first and second roller means 32 and 34. In the preferred embodiment the drive means synchronously rotates the first and second roller means 32 and 34 whereby each of the roller means has a substantially identical speed. By so moving the line 4 through the rotating roller means 32 and 34, having the opening 48 of smaller diameter than the diameter of the line 4 formed therebetween, it will be understood that portions of the line 4 are squeezed by the rollers 32 and 34 so that other portions of the line 4 are forced into the cavities 42 and 46 thereby forming protuberances on the line 4.

After having been heated and squeezed, the line 4 is then passed through the tubing 54 and the coolant 58 so that the line 4 is cooled to retain its final form. After having been cooled, the line 4 exits the second housing 10 and is collected on the spool 12.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An apparatus for forming protuberances on a line, comprising:
   heating means for heating the line; and
   squeezing means for compressing portions of the heated line so that other portions of the line are forced outward of said compressed portions to form protuberances with respect thereto, said squeezing means including:
      first roller means including a first surface defining a first groove extending perimetrically around said first roller means, said first surface having a plurality of cavities disposed therein;
      second roller means including a second surface defining a second groove extending perimetrically around said second roller means, said second surface having a plurality of cavities disposed therein; and
      support means for retaining said first and second roller means in adjacent relation so that said first and second grooves are substantially aligned.

2. An apparatus as defined in claim 1, further comprising guide means for directing the line through the substantially aligned first and second grooves.

3. An apparatus as defined in claim 2, further comprising cooling means for cooling the squeezed line.

4. An apparatus as defined in claim 3, further comprising collecting means for collecting the cooled line.

5. An apparatus for forming protuberances on a line having a predetermined diameter, comprising:
   a first cylindrical member including a first surface defining a first groove extending circumferentially around said first cylindrical member, said first surface including a plurality of cavities disposed therein;
   a second cylindrical member including a second surface defining a second groove extending circumferentially around said second cylindrical member, said second surface including a plurality of cavities disposed therein;
   support means for retaining said first cylindrical member adjacent said second cylindrical member so that said first groove is aligned with said second groove whereby adjacent portions of said first and second grooves define an opening; and
   moving means for passing the line through said opening so that portions of the line enter said cavities thereby forming protuberances on the line.

6. An apparatus as defined in claim 5, wherein said moving means includes:
   guide means for directing the line toward said opening; and
   drive means for synchronously rotating said first and second cylindrical members.

7. An apparatus as defined in claim 5, wherein said pluralities of cavities are disposed on the respective surfaces in predetermined arrays.

8. An apparatus as defined in claim 7, wherein:
   said first groove has a substantially semi-circular cross-sectional shape;
   said second groove has a substantially semi-circular cross-sectional shape; and
   said opening has a substantially circular shape with a diameter less than the predetermined diameter of the line.

9. An apparatus as defined in claim 8, wherein said moving means includes:
   guide means for directing the line toward said opening; and
   drive means for rotating said first and second cylindrical members.

10. An apparatus as defined in claim 9, further comprising heating means, associated with said first and second cylindrical members, for heating the line.

11. An apparatus as defined in claim 10, further comprising cooling means for cooling the line after the line passes through said opening.

12. An apparatus for forming protuberances on a line, comprising:
   a first housing;
   first roller means rotatably mounted in said first housing, said first roller means including a first circumferentially extending groove having a plurality of cavities disposed in the surface thereof;
   second roller means including a second circumferentially extending groove having a plurality of cavities disposed in the surface thereof, said second roller means rotatably mounted in said first housing in parallel, tangential relation with said first roller means so that said first and second grooves are aligned and define an opening therebetween;
   heating means, disposed in said first housing, for heating the line to a selectable temperature;
   a second housing associated with said first housing;
   cooling means disposed in said second housing; and
   moving means for moving the line through said opening defined between said first and second grooves so that the line is squeezed therebetween to form protuberances on the line and for moving the line through said cooling means so that the squeezed line is cooled.

13. An apparatus as defined in claim 12, wherein said moving means includes:
   first guide means for directing the line toward said opening;
   second guide means for directing the line from said opening and toward said second housing; and
   drive means for synchronously rotating said first and second roller means so that the line is moved therebetween.

14. An apparatus as defined in claim 12, wherein:
   said moving means includes drive means for rotating said first and second roller means at a selectable speed; and
   said heating means includes:
      a heating element; and
      means for selectably setting the output of said heating element in correspondence with the selectable speed at which said first and second roller means are driven.

* * * * *

UNITED STATES PATENT AND TRADEMARK OFFICE
CERTIFICATE OF CORRECTION

PATENT NO. : 4,363,613

DATED : December 14, 1982

INVENTOR(S) : Larry W. Stelck

It is certified that error appears in the above–identified patent and that said Letters Patent are hereby corrected as shown below:

Claim 8, line 1 (Column 6, line 8), the numeral "7" should be --5--.

Signed and Sealed this

Twenty-second Day of March 1983

[SEAL]

Attest:

GERALD J. MOSSINGHOFF

Attesting Officer     Commissioner of Patents and Trademarks